United States Patent
Chang

(10) Patent No.: US 6,370,984 B1
(45) Date of Patent: Apr. 16, 2002

(54) FASTENING STRUCTURE OF A SKIDPROOF COVER FOR AUTOMOBILE PEDALS

(75) Inventor: Yu-Ling Chang, Changhua Hsien (TW)

(73) Assignee: Yet Chang Mobile Goods Co., Ltd., Changhua Hsien (TW)

(*) Notice: Subject to any disclaimer, the term of this patent is extended or adjusted under 35 U.S.C. 154(b) by 0 days.

(21) Appl. No.: 09/736,785

(22) Filed: Dec. 15, 2000

(51) Int. Cl.[7] ................................................. G05G 1/16
(52) U.S. Cl. ...................................................... 74/563
(58) Field of Search ........................... 74/560, 563, 564, 74/532, 594, 558, 512, 513, 482, 561, 562, 478, 478.5, 562.5

(56) References Cited

U.S. PATENT DOCUMENTS 1,292,760 A * 1/1919 Grant ........................... 74/563
1,455,675 A * 5/1923 Sinclair ........................ 74/563
2,518,056 A * 8/1950 Olsen ........................... 74/478
5,398,570 A * 3/1995 Chae ........................... 280/259
5,913,948 A * 6/1999 Lien ............................. 74/560
D431,217 S * 9/2000 Asakura ..................... D12/174

FOREIGN PATENT DOCUMENTS

GB 7115 * of 1915 .................. 74/563

* cited by examiner

Primary Examiner—Rodney H. Bonck
Assistant Examiner—David D. Le
(74) Attorney, Agent, or Firm—Harrison & Egbert

(57) ABSTRACT

An automobile pedal cover including a cover piece, a holding member, two locating rods, and two locating bolts. The holding member is adjustably joined with the cover piece in conjunction with the two locating rods and the two locating bolts, thereby enabling the automobile pedal cover to fit the automobile pedals of various specifications.

1 Claim, 8 Drawing Sheets

FASTENING STRUCTURE OF A SKIDPROOF COVER FOR AUTOMOBILE PEDALS

BACKGROUND OF THE INVENTION

1. Field of the Invention

The present invention relates generally to a skidproof covert for the automobile pedal, and more particularly to a structure for fastening the skidproof cover to the automobile pedal.

2. Description of Related Art

As shown in FIG. 1, a prior art skidproof cover 11 has a plurality of fastening straps 12 and skidproof rings 13. The cover 11 is fastened to the automobile pedal 10 by the fastening straps 12. The cover 11 cannot be securely fastened with the automobile pedal 10 by the fastening straps 12.

As shown in FIGS. 2 and 3, another prior art skidproof cover is fastened to the automobile pedal by a fastening seat 21 in conjunction with an actuating member 22, a confining member 23, and a plurality of fastening screws. The automobile pedal is held in the confining member 23. This prior art fastening structure is complicated in construction and is therefore not cost-effective. In addition, the confining member 23 fits only automobile pedals of certain sizes and specifications.

BRIEF SUMMARY OF THE INVENTION

The primary objective of the present invention is to provide an automobile pedal cover with a fastening structure which is free of the shortcomings of the prior art fastening structures described above.

The fastening structure of the present invention is simple in construction and cost-effective. The skidproof cover of the present invention is fastened to an automobile pedal by a holding member in conjunction with two locating rods and two locating bolts.

The features and advantages of the present invention will be more readily understood upon a thoughtful deliberation of the following detailed description of the present invention with reference to the accompanying drawings.

DETAILED DESCRIPTION OF THE INVENTION EMBODIMENTS

Figure 1:
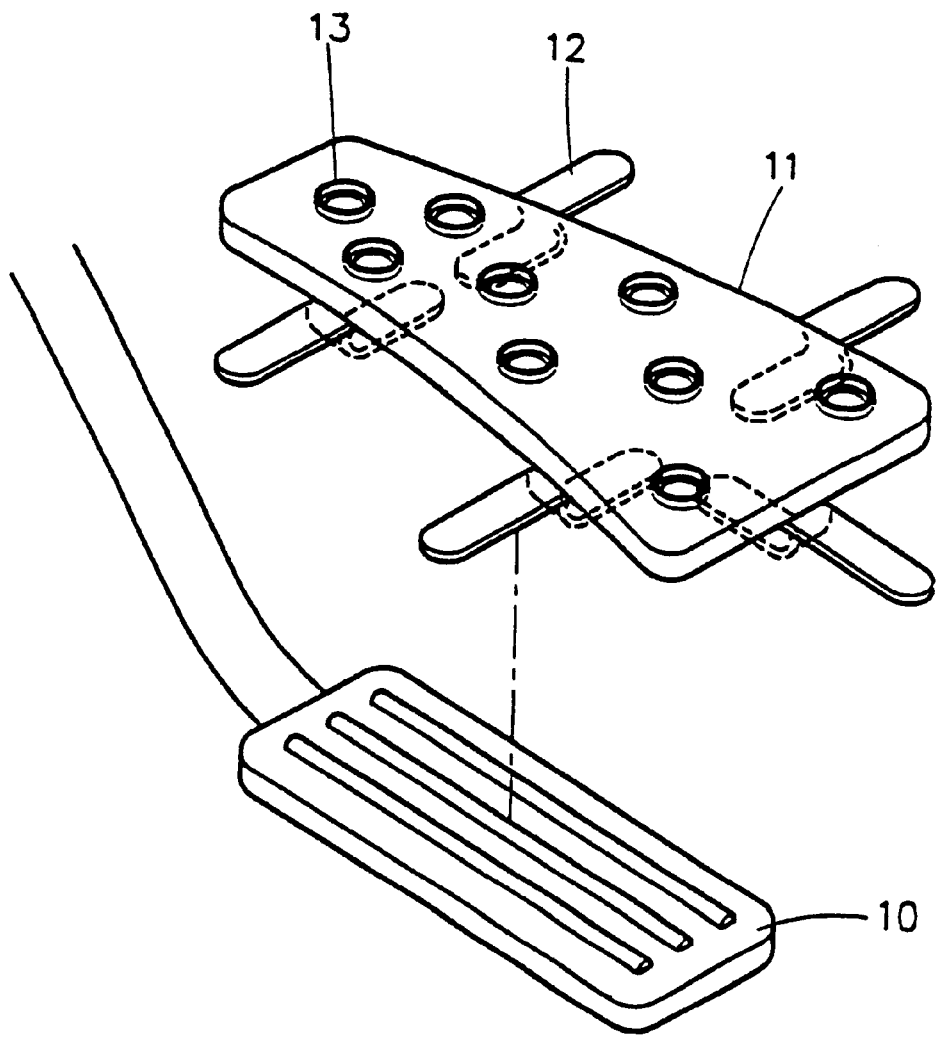
FIG. 1 shows a perspective view of an automobile pedal cover of the prior art.
Figure 2:
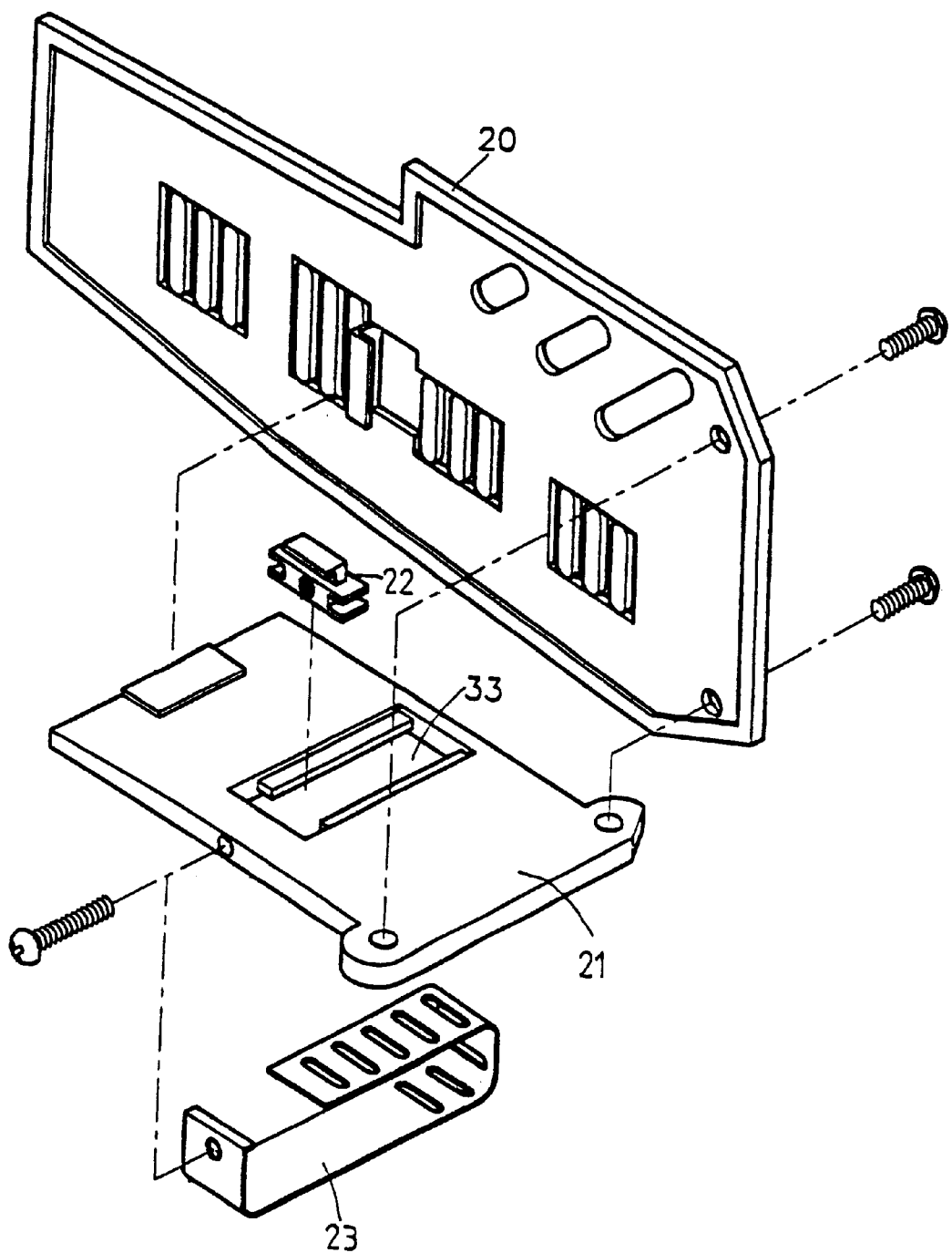
FIG. 2 shows an exploded view of another automobile pedal cover of the prior art.
Figure 3:
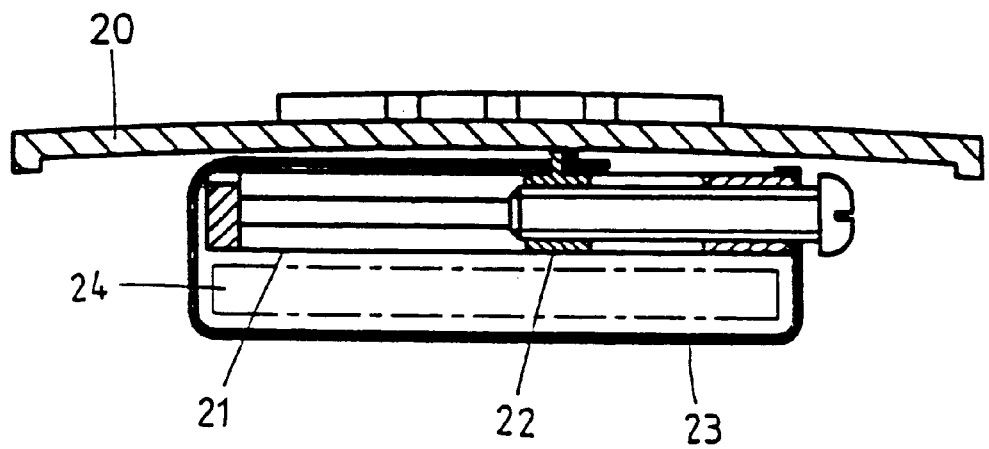
FIG. 3 shows a sectional view of the automobile pedal cover of the prior art as shown in FIG. 2.
Figure 4:
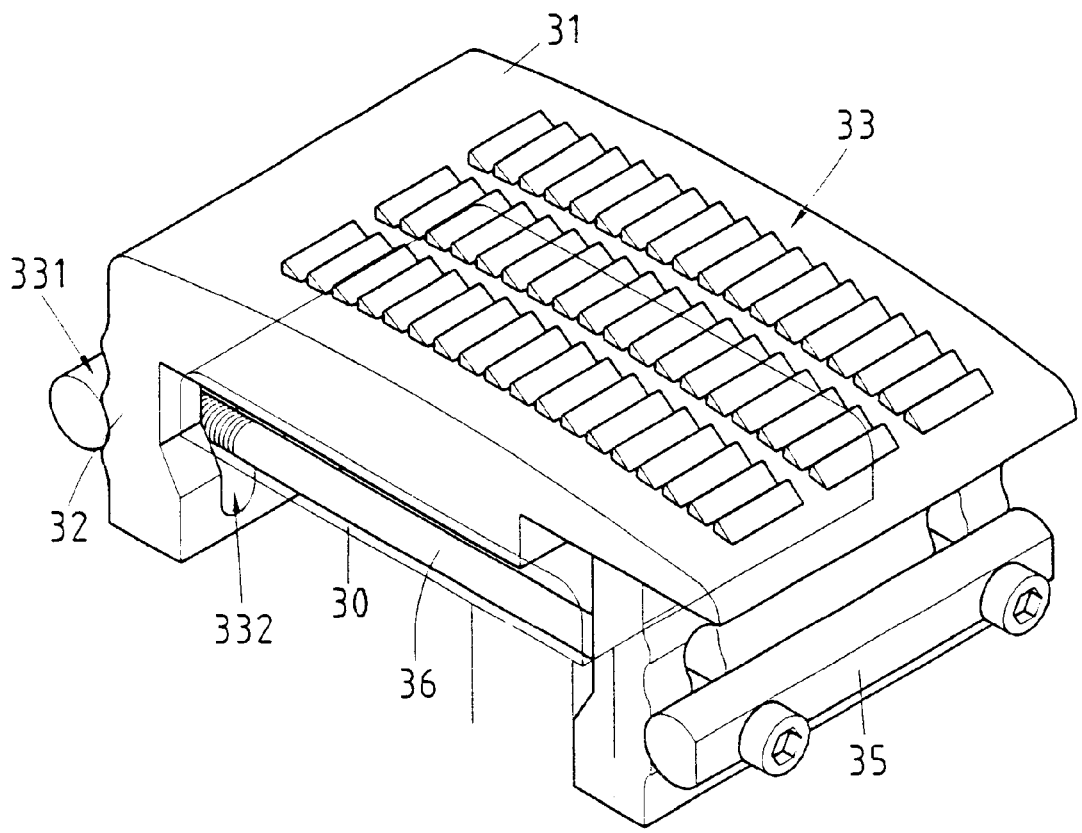
FIG. 4 shows a perspective view of the present invention.
Figure 5:
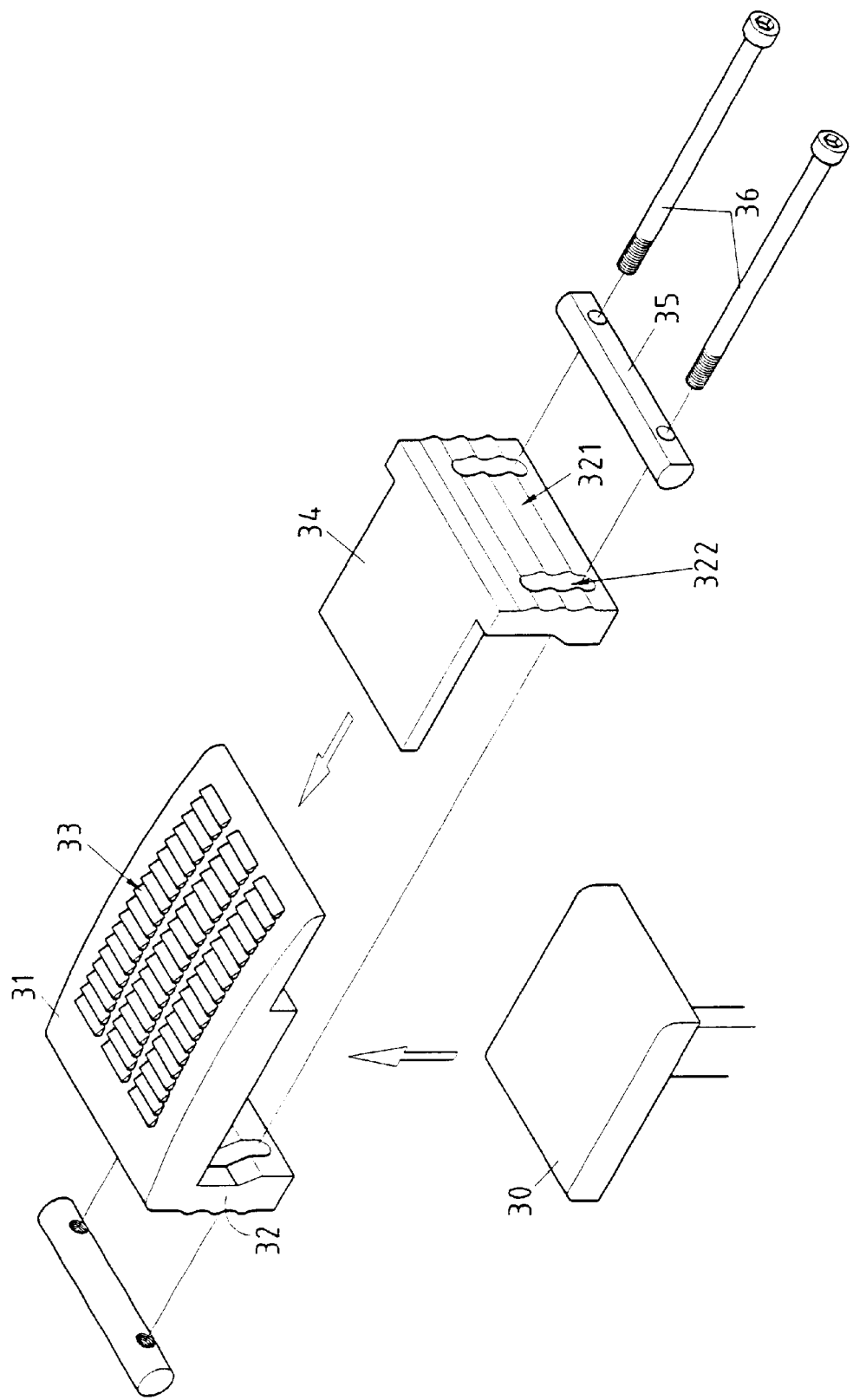
FIG. 5 shows an exploded view of the present invention.
Figure 6:
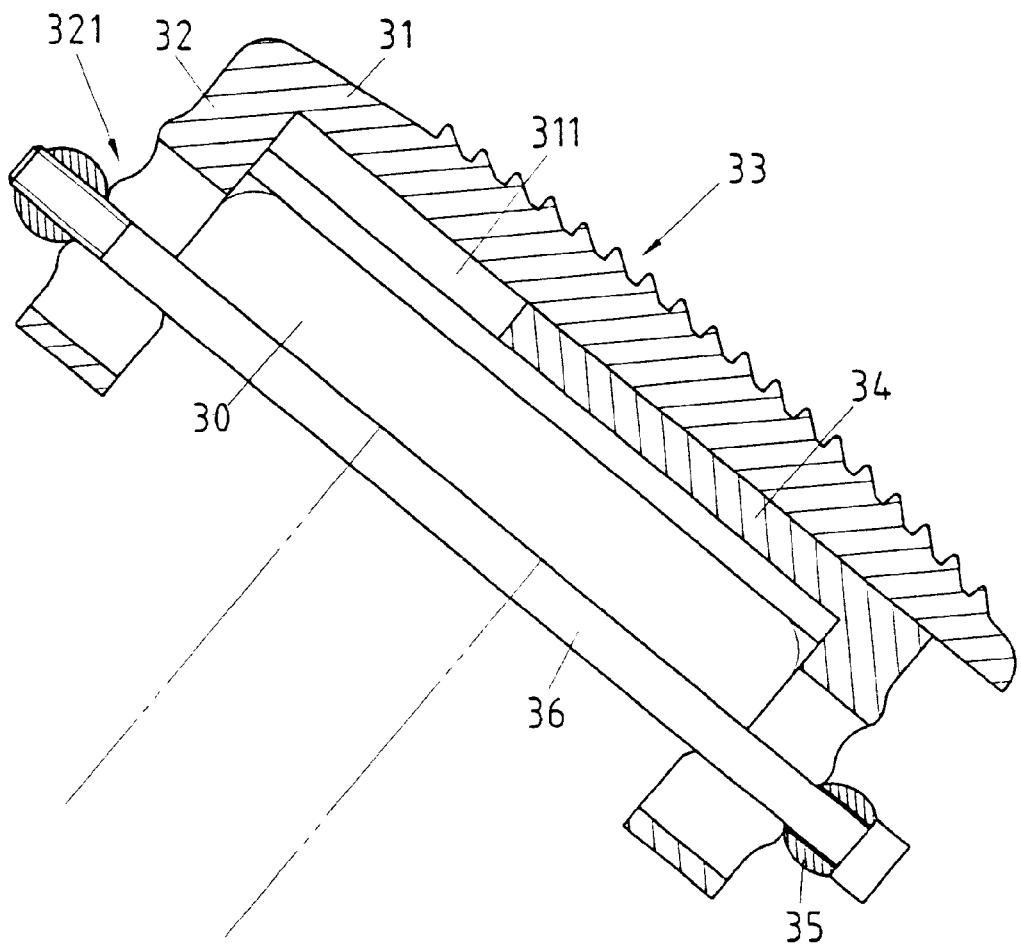
FIG. 6 shows a sectional view of the present invention.
Figure 7:
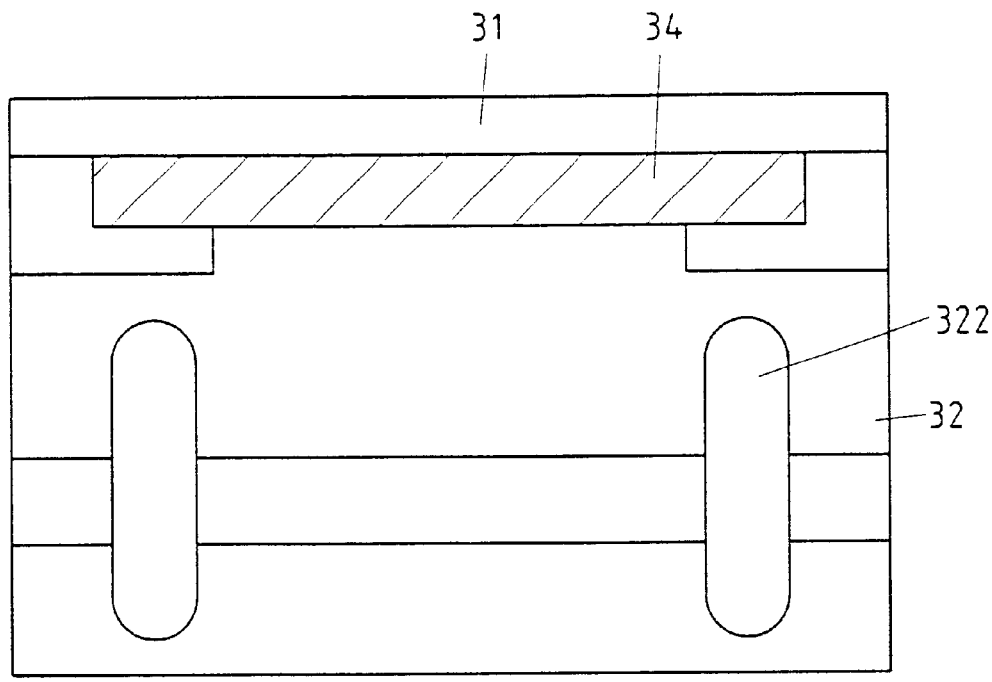
FIG. 7 shows another sectional view of the present invention.
Figure 8:
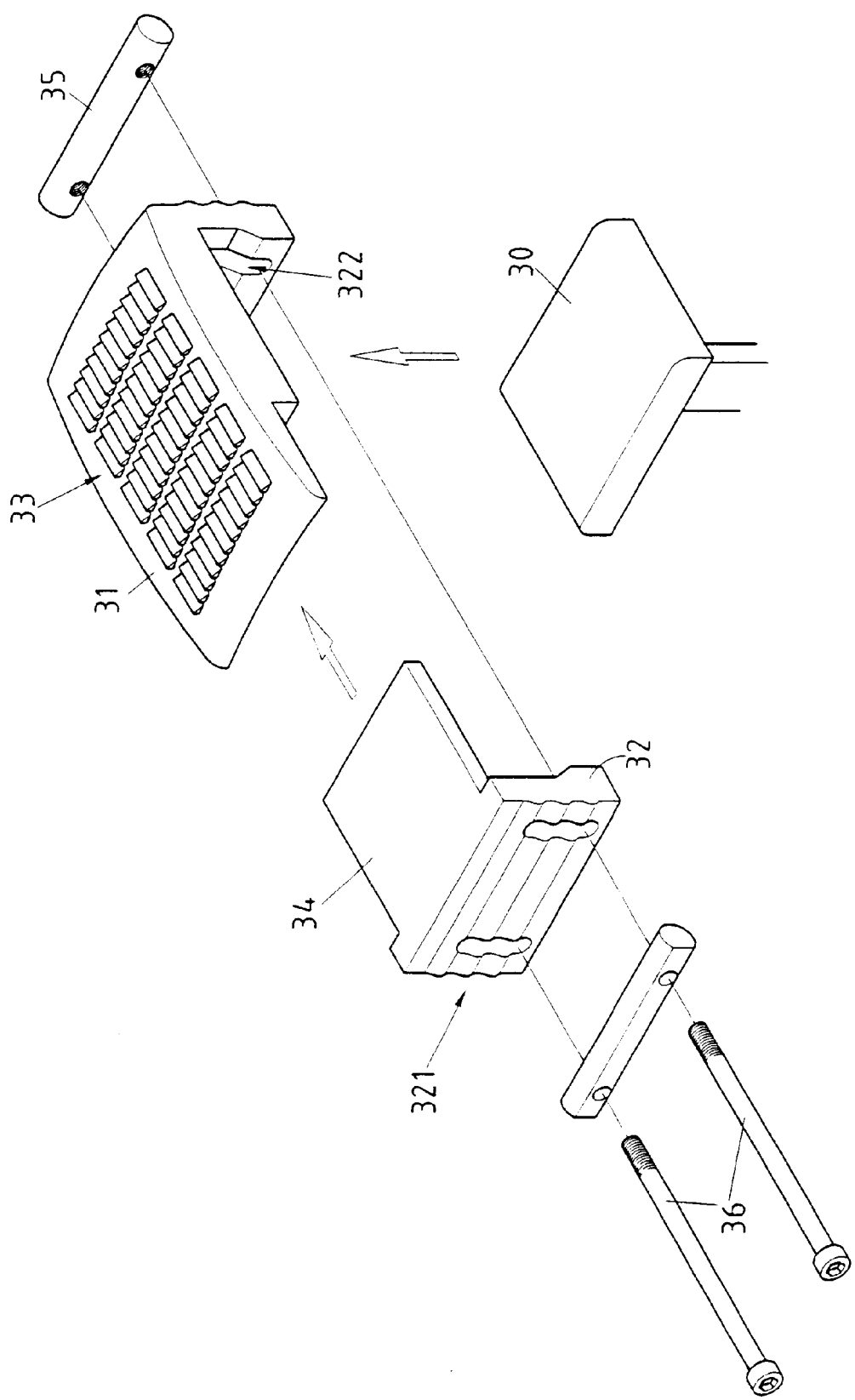
FIG. 8 shows another exploded view of the present invention.

As shown in FIGS. 4–8, a skidproof cover embodied in the present invention is intended to cover an automobile pedal and is formed of a cover piece 31, a holding member 34, two locating rods 35, and two locating bolts 36.

The cover piece 31 is provided with a skidproof upper surface 33 and a fixation wall 32 extending downward from one end of the skidproof upper surface 33 such that the fixation wall 32 is perpendicular to the skidproof upper surface 33. The cover piece 31 is provided with a guide surface 321, a guide slot 311, and two through holes 322.

The holding member 34 is of an L-shaped construction and is provided with a fixation wall 32 having two through holes 322. The holding member 34 has a long side which is slidably disposed in the guide slot 311 of the cover piece 31.

An automobile pedal 30 is covered by the cover piece 31 in conjunction with the holding member 34, the two locating rods 35, and two locating bolts 36. The holding member 34 is adjustably joined with the cover piece 31 such that the cover piece 31 and the holding member 34 are held between the two locating rods 35 in conjunction with the two locating bolts 36 which are put through the through holes 322 of the holding member 34 and the cover piece 31.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

I claim:

1. An automobile pedal cover comprising:

a cover piece of an L-shaped construction and having a skidproof upper surface and a fixation wall extending from one end of said skidproof upper surface such that said fixation wall is perpendicular to said skidproof upper surface, said fixation wall being provided with two through holes which are separated from each other by an interval, said cover piece further comprising a guide surface and a guide slot; and a holding member of an L-shaped construction and having a fixation wall which is provided with two through holes corresponding in location to said two through holes of said fixation wall of said cover piece;

wherein said cover piece covers an automobile pedal in conjunction with said holding member, two locating rods, and two locating bolts such that a long side of said holding member is slidably received in said guide slot of said cover piece, and such that said cover piece and said holding member are located between said two locating rods whereby said two locating rods are positioned by said two locating bolts which are put through said through holes of said fixation wall of said holding member and said through holes of said fixation wall of said cover piece.

* * * * *